United States Patent [19]  [11] Patent Number: 4,498,807
Kirkpatrick et al.  [45] Date of Patent: Feb. 12, 1985

[54] DRAINAGE CHANNEL WITH MEANS FOR MAINTAINING PROPER SLOPE DURING INSTALLATION

[75] Inventors: Larry E. Kirkpatrick; Barry C. Williams, both of Statesville, N.C.

[73] Assignee: Polydrain, Inc., Troutman, N.C.

[21] Appl. No.: 530,271

[22] Filed: Sep. 8, 1983

[51] Int. Cl.³ .................. E02B 11/00; E01C 11/22; E01F 5/00; E04G 17/00
[52] U.S. Cl. .......................................... 405/43; 249/3; 249/208; 210/163; 404/4
[58] Field of Search ............... 405/36, 43–46, 405/118–123, 157, 244; 404/2–5, 25; 210/163–166; 52/166, 295; 249/2, 3, 5, 10, 11, 207, 208; 248/49, 70

[56] References Cited

U.S. PATENT DOCUMENTS

| 139,324 | 5/1873 | McClunie | 404/2 |
| 1,886,041 | 11/1932 | Frey | 404/4 |
| 2,635,320 | 4/1953 | Ornitz | 249/5 |
| 2,908,959 | 10/1959 | Hogan et al. | 249/208 |
| 3,157,098 | 11/1964 | Mason | 249/5 |
| 3,225,545 | 12/1965 | Flegel | 405/43 |
| 3,446,025 | 5/1969 | Koch | 405/43 |
| 3,788,756 | 1/1974 | Ito | 404/4 |
| 4,066,237 | 1/1978 | Bentz | 249/208 X |
| 4,099,354 | 7/1978 | De Pirro | 249/207 X |

FOREIGN PATENT DOCUMENTS

| 964440 | 3/1975 | Canada | 249/207 |
| 2506705 | 8/1976 | Fed. Rep. of Germany | 404/2 |
| 2341706 | 9/1977 | France | 405/119 |

Primary Examiner—Cornelius J. Husar
Assistant Examiner—Nancy J. Stodola
Attorney, Agent, or Firm—W. Thad Adams, III

[57] ABSTRACT

An anchor 20 is disclosed for supporting an open top drainage channel 40 within a trench. Anchor 20 permits accurate placement and easy adjustment of channel 40 and thereafter permits the entire channel 40 to be embedded in concrete in a single pour. The anchor 20 is embedded within the earth defining the trench and counteracts the natural buoyancy so that channel 40 does not float upwardly in the unhardened concrete.

11 Claims, 4 Drawing Figures

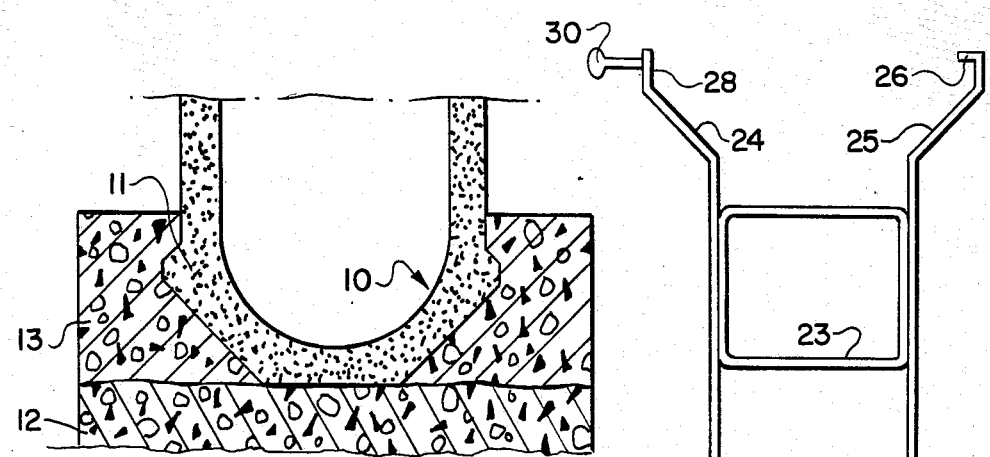
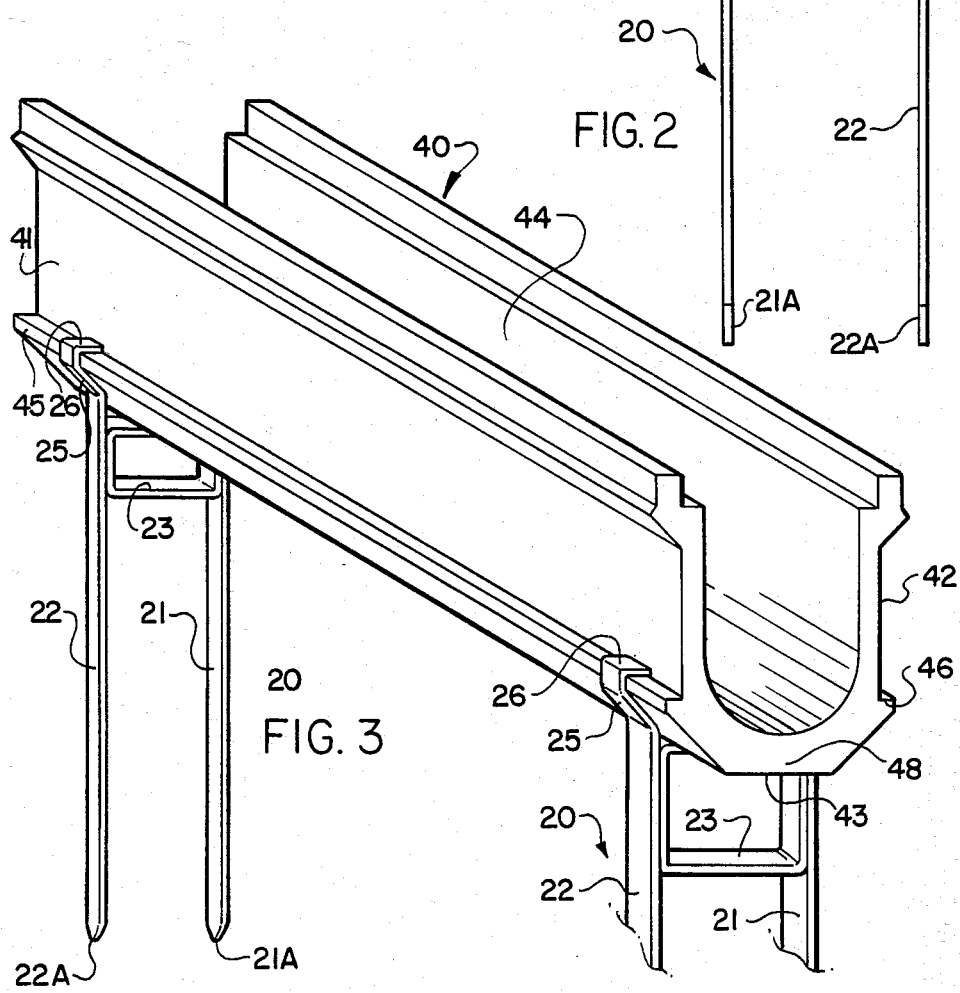

DRAINAGE CHANNEL WITH MEANS FOR MAINTAINING PROPER SLOPE DURING INSTALLATION

TECHNICAL FIELD AND BACKGROUND OF THE INVENTION

This invention relates to a drainage channel with means for maintaining proper slope during installation of the channel, and a method for installing a drainage channel in concrete. Drainage channels of the type referred to in this application are open top drainage channels which are used to drain parking lots, airports and driveways, as well as various interior fluid drainage applications. Usually a longitudinally extending grate is set into the open top of the drainage channel. Both the channel itself and the grate may be constructed of various materials and according to various processes to support light, medium or heavy loads. In the particular embodiment discussed in this application, the drainage channels are cast of "polyester concrete", a concrete aggregate material containing quartz and inert mineral fillers bonded with polyester resin.

Typically, the drainage channel is cast in relatively short lengths of one meter. Each channel has a predetermined depth and a bottom slope, for example, 0.6%, from one end to the other. A drainage channel is formed by using cast channel segments having successively higher walls so that when put in the proper order in a trench they collectively form a run having a pre-determined slope as described above.

The top opening of the channel is usually covered with a grating and is flush with or very slightly below the surface to be drained. The channel segments are embedded in concrete within a trench which must be properly prepared to receive the channel segments in proper order and with proper slope. Usually, the trench must be relatively level relative to the surface to be drained and properly graded with a level string line.

Even if the trench is properly excavated, the channels must be correctly placed and secured in the trench. This is difficult because the channel must rest on a bed of concrete or some similar bonding agent. Heretofore, difficulty has been experienced in properly placing the channels within the trench and maintaining their proper position until the concrete hardens. This is because the channels are naturally buoyant. If the channels were placed in a trench and concrete poured around the channel all the way up to the top opening of the channel, it would float upwardly from its proper position. This occurs because each channel has a central void which accounts for a substantial percentage of its volume, but not its weight. The channel, whether wholly or partially immersed in unset concrete (which acts as a fluid) undergoes a loss in weight equal to the weight of the fluid it displaces. The channel therefore tends to rise to the depth in the unset concrete so that the displaced volume to concrete weighs the same as the entire channel. If this buoyancy is permitted to alter the slope of the channel segments, the drainage channel drains either poorly or not at all. Heretofore, this problem has been solved first by placing a layer of "grout", such as very thick concrete, in the bottom of the trench. The channels are then laid on the grout layer and grout is either taken away or added until the channels are properly leveled with a string line. Then, concrete is poured up to and just over an enlarged, outwardly extending base on the channel and allowed to harden overnight. The hardened concrete acts as an anchor which secures the channel into the trench. Then, the next day, the remainder of the concrete is poured into the trench up to the level of the top opening of the channel. This concrete is allowed to harden whereupon the process is complete. This process is slow, expensive and requires considerable skill. Furthermore, adjustments must be made by removing or adding grout to the grout layer on which the channel is resting. This requires that channel segments be removed to get at the grout layer.

Furthermore, the separate placement of the grout layer, the first pour, and the second pour of concrete results in a fragmented structure within which the drainage channel is encased. A fine crack is left between the first pour of concrete and the second pour which remains even after all the concrete has hardened and cured. This is a potential source of leakage of ground water into the structure which over a period of time can cause deterioration of the drainage system, especially if it is subject to freezing.

SUMMARY OF THE INVENTION

Therefore, it is an object of the present invention to provide a drainage channel which is easy to install and can be accurately adjusted for proper slope and drainage.

It is another object of the present invention to provide a drainage channel assembly which can be properly embedded within concrete in a trench with one pour of concrete.

It is another object of the present invention to provide an anchor for maintaining proper slope of a drainage channel during installation in concrete by counteracting the buoyancy of the drainage channel.

It is another object of the present invention to provide an anchor for maintaining proper slope of a drainage channel during installation wherein the bottom of the drainage channel may be elevated above the bottom of the trench into which it is to be installed to enable easy adjustment and to permit concrete to flow completely beneath the channel.

It is yet another object of the present invention to provide a method of installing a drainage channel in concrete in one pour.

These and other objects and advantages of the present invention are achieved in the preferred embodiment of the method and apparatus below by providing means for maintaining proper slope in a drainage channel during installation of the channel in concrete by counteracting the buoyancy of the channel. The means for maintaining proper slope include an anchor having at least one relatively long spike for being inserted into the earth defining the trench within which the channel is to be installed. Clasp means are carried by the spike and connecting means are carried by the outer walls of the channel for connecting to and cooperating with the clasp means to retain the channel at its proper slope while concrete is poured around the channel. The anchor prevents the channel from floating upwardly in the unhardened concrete, permitting the concrete to harden with the channel in its proper position.

According to one embodiment of the present invention, the connector means comprises an outwardly projecting rib extending along the length of the channel and the clasp includes a detent for being placed over the upper surface of the rib in channel-retaining relation.

According to a preferred embodiment of the invention, the drainage channel is of the type characterized by having opposing sidewalls, a bottom wall and a top opening opposite the bottom wall for receiving fluid. The ribs are integrally formed in the opening sidewalls and cooperate with a pair of spaced-apart arms carried by the at least one relatively long spike for embracing the lower extent of the channel and cooperating by means of a detent on the free end of each arm with the upper surface of the ribs.

Preferably, the arms are shaped to correspond to the shape of the bottom wall of the channel and rest against the bottom of the channel in upwardly supporting relation.

BRIEF DESCRIPTION OF THE DRAWINGS

Some of the objects and advantages of the invention have been set forth above. Other objects and advantages of the invention will appear as the description of the invention proceeds, when taken in conjunction with the following drawings, in which:

FIG. 1 is a vertical cross-sectional view of a channel embedded in concrete according to the prior art;

FIG. 2 is a vertical elevational view of an anchor according to the present invention;

FIG. 3 is a vertical cross-sectional view of a channel according to the present invention; and, FIG. 4 is a perspective view of a length of channel with two of the anchors according to the present invention attached thereto.

DESCRIPTION OF THE PREFERRED EMBODIMENT

Figure 4:
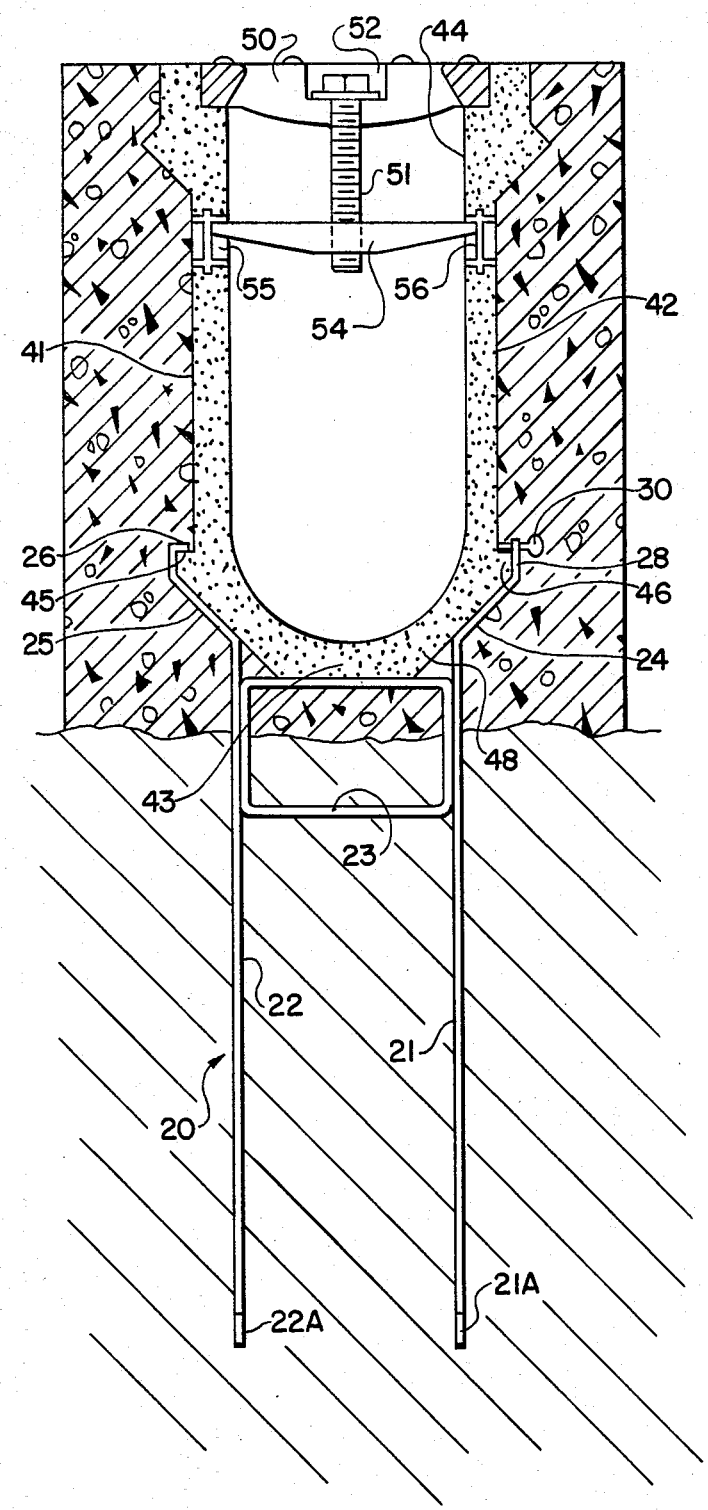

Referring now specifically to the drawings, the prior art will be explained briefly with reference to FIG. 1. A channel 10 is provided with an enlarged base 11. Channel 10 is positioned in a trench (not shown) on a base of grout 12, which may suitably be a mixture of very thick concrete. By pressing the channel into the grout or, alternatively, adding more grout onto which the base 11 rests, the desired level of the channel is approximated. Once the channel is adjusted, a first pour of concrete is made which extends upwardly past the enlarged base 11 into contact with the vertical sidewalls of channel 10. If the layer 13 were poured to extend all the way up to the top of the channel, the relatively light weight of the channel would cause the channel to float away from its base on the grout 12, causing misalignment of the channel and its slope. Later, after layer 13 has hardened, the remainder of the concrete is poured up to the level of the top opening (not shown). As is apparent, the various layers of concrete form minute spaces at their boundaries which are subject to infiltration by ground water which can eventually result in deterioration of the structure due to freezing of the water.

Referring now to FIG. 2, anchor means according to the present invention are illustrated and broadly designated at reference numeral 20. Anchor 20 comprises a pair of elongated spikes 21 and 22, preferably having pointed lower ends 21A and 22A, respectively. Spikes 21 and 22 are preferably formed of a suitable iron or steel flat bar and are held in a parallel, spaced-apart relationship by means of a rectangular cross piece 23 to which spikes 21 and 22 are welded.

Clasp means are carried by the upper end of spikes 21 and 22 and comprise arms 24 and 25. Arms 24 and 25 extend outwardly away from each other at an approximate 45° angle to enable them to fit around the base of a channel. A detent 26 is carried by the free end of arm 25 and a detent 28 is carried by the free end of arm 24. Detent 28 includes an adjustment means comprising a threaded hole (not shown) in arm 24 into which is threaded a bolt 30.

Referring now to FIG. 3, two of the anchors 20 are shown in position on a length of open drainage channel 40. Drainage channel 40 includes opposing sidewalls 41 and 42, a bottom wall 43 and a top opening 44 opposite bottom wall 43. The inner surface of sidewalls 41, 42 and bottom wall 43 define a fluid-carrying space. Channel 40 includes connecting means carried by outer walls 41, 42 and preferably comprise outwardly projecting ribs 45, 46 extending along sidewalls 41, 42, respectively along the length of channel 40. Preferably, ribs 44, 45 are integrally formed when channel 40 is cast and, with bottom wall 43, define an enlarged base 48. As is shown in FIG. 3, the upper surface of ribs 45, 46 are planar and define a surface for cooperating with arms 24, 25 and detents 28 and 26, respectively. Preferably, a pair of anchors 20 is used for each length of channel 40.

Referring now to FIG. 4, anchor 20 is shown driven deeply into the earth beneath a trench into which channel 40 is embedded. Cross piece 23 is also partially buried in the earth, leaving a void at the top into which the concrete fills as it is poured into the trench. The enlarged base 48 of channel 40 rests on the upper, longitudinally extending member of cross piece 23.

Still referring to FIG. 4, detent 26 is shown in position on the side and top surface of rib 45. Detent 28 is shown in position over the side and top surfaces of rib 46. When positioning the anchor in place on channel 40, the bolt 30 is in its retracted position as is shown in FIG. 2. After placing the anchor in position, bolt 30 is turned inwardly until the free end of the bolt is biased against sidewall 42. Cooperation of bolt 30 with the upper surface of rib 45 then prevents anchor 20 from being removed from channel 40.

Ordinarily, the individual anchors 20 will be implanted in the trench so that they collectively define a proper slope for the channels 40. With the bolt 30 in its retracted position, the channels 40 are easily placed onto anchors 20. Then bolt 30 is tightened against sidewall 41. As is shown in FIG. 4, the cross piece 23 may be partially buried in the bottom of the trench. This leaves a space beneath each channel 40 into which concrete fills when the pour is made. Any adjustments or modifications in the desired slope can be easily performed before or after the concrete is poured.

Once bolt 30 is tightened, the slope can be adjusted by either pulling up on channel 40 which would bring anchor 20 out of the ground to a desired extent or by pushing downwardly on channel 40 which would drive the anchor 20 deeper. Since all of the concrete is poured at one time in a single mass, there are no cracks or lines in the concrete through which ground water can seep. Thus, not only is the entire system much easier to install but offers enhanced durability because of the integrity of the hardened concrete structure in which the individual channels 40 are buried. After channels 40 are properly embedded in concrete a grating 50 is placed into the top opening 44. A bolt 51 is placed through a counter sunk hole 52 in grating 50 and into the fluid-carrying space beneath top opening 44. A wing-shaped locking member 54 is threaded onto the free end of bolt 51. Locking member 54 is somewhat wider than the lateral dimensions of channel 40 and is designed to cooperate with a pair of recesses 55 and 56 formed on the inner surface of sidewalls 41 and 42, respectively. By rotating bolt 51, locking member 54 fits into recesses 55 and 56 and as the bolt 51 is tightened, locks grate 50 into the open end 44 of channel 40. Therefore, while grate 50 is securely locked into position on top of channel 40, it can easily be removed for access to channel 40 for cleaning or any other reason.

One of the important features of anchor 20 is that it only cooperates with the base 48 of channel 40 and does not extend upwardly to or across the top opening 44 and does not interfere in any respect with the placement on or removal from channel 40 of the grate 50.

Anchor 20 also provides additional stability and strength to the entire structure since it extends substantially lower into the ground than the concrete. The precise shape of anchor 20 can be varied to accommodate different types of drainage channels, as can be the number of anchors 20 used per channel 40 segment.

A drainage channel with means for maintaining proper slope during installation and a method for installing such a drainage channel is described above. Various details of the invention may be changed without departing from its scope. Furthermore, the foregoing description of a preferred embodiment of the apparatus and method according to the present invention is provided for the purpose of illustration only and not for the purpose of limitation—the invention being defined by the claims.

I claim:

1. In a line, such as a drainage channel, for being embedded in a trench in concrete at a pre-determined slope, said line being defined by an elongate body having outer walls and inner, spaced-apart walls defining a fluid-carrying space therebetween, the improvement which comprises anchor means for maintaining proper slope during installation of the line in concrete by counteracting the buoyancy of the line, said anchor means including:
   (a) at least one relatively long spike for being inserted into earth defining the trench;
   (b) clasp means carried by said spike; and,
   (c) connecting means carried by the outer walls of said channel for connecting to and cooperating with said clasp means to retain the channel at its proper slope while the concrete is poured around the channel until the concrete hardens by preventing the channel from floating upwardly in the unhardened concrete; said connecting means comprising an outwardly projecting rib extending along the length of the channel and said clasp includes a detent for being placed over the upper surface of the rib in channel-retaining relation thereto.

2. In a line according to claim 1, wherein said connecting means comprises an outwardly projecting rib extending along the length of opposite sides of said channel and wherein said clasp means includes a pair of spaced-apart arms for embracing the lower extent of the channel, and a detent on the free end of each arm for being placed over the upper surface of the rib in channel-retaining relation thereto.

3. In a line according to claim 2, wherein one of said detents includes adjustment means for selectively loosening and tightening said arm and said detents relative to said channel and said ribs, respectively.

4. In a line according to claim 3, wherein said adjustment means comprises a bolt threaded through one or the other of said arms for being selectively engaged and disengaged with a respective one of said ribs.

5. In a drainage channel of the type characterized by having opposing side walls, a bottom wall and a top opening opposite said bottom wall for receiving fluid into said channel, said side and bottom walls having an outer surface, and an inner surface, of said side walls collectively defining a fluid-carrying space therebetween, the improvement which comprises anchor means for maintaining proper slope in the drainage channel during installation thereof in a trench in concrete by counteracting buoyancy of the channel, said means including:
   (a) at least one relatively long spike for being inserted into earth defining the trench;
   (b) clasp means carried by said spike; and,
   (c) connecting means carried by the outer walls of said channel for connecting to and cooperating with said clasp means to retain the channel at its proper slope while the concrete is poured around the channel until the concrete hardens by preventing the channel from floating upwardly in the unhardened concrete; said connecting means comprising a rib projecting outwardly from the outer surface of each said opposing side walls of said channel and wherein said clasp includes a pair of spaced-apart arms for embracing the channel and a detent on the free end of each arm for being placed over the upper surface of each of said ribs in channel-retaining relation thereto.

6. In a drainage channel according to claim 5, wherein said ribs are integrally formed in said opposing side walls.

7. In a drainage channel according to claim 6, wherein said ribs extend substantially along the length of said channel.

8. In a drainage channel according to claim 5, wherein one of said detents includes adjustment means for selectively loosening and tightening said arms and detents relative to said channel and said ribs, respectively.

9. In a drainage channel according to claim 8, wherein said adjustment means comprises a bolt threaded through said one arm for being selectively engaged and disengaged with said rib.

10. In a drainage channel according to claim 5, wherein said anchor includes a pair of spikes secured together in parallel, spaced-apart relation.

11. In a drainage channel according to claim 5, wherein said arms are shaped to correspond to the shape of the bottom wall of said channel and rest against the bottom wall of said channel in upwardly supporting relation thereto.

* * * * *